United States Patent [19]
Walker

[11] 3,778,164
[45] Dec. 11, 1973

[54] OPHTHALMOMETER HAVING ALTERNATIVE VIEWING MEASURING SYSTEMS AND INCLUDING IMPROVED CONTACT LENS HOLDING MEANS

[75] Inventor: Terence Walker, East Aurora, N.Y.

[73] Assignee: American Optical Corporation, Southbridge, Mass.

[22] Filed: Nov. 29, 1972

[21] Appl. No.: 310,292

[52] U.S. Cl.............. 356/124, 240/46.03, 351/6, 351/9, 351/13, 351/16, 356/244
[51] Int. Cl...... G01b 9/00, G01b 21/04, A61b 3/10
[58] Field of Search ................ 351/6, 9, 13, 16; 356/124, 244, 246; 240/46.03

[56] References Cited
UNITED STATES PATENTS
3,598,478   8/1971   Townsley ................ 351/6
3,027,804   4/1962   Wesley et al. ................ 356/244

Primary Examiner—Paul A. Sacher
Attorney—William C. Nealon et al.

[57] ABSTRACT

Ophthalmometer including a measuring circuit for measurement of the curvature of the cornea and contact lens curvatures with a built-in viewing circuit which is activated by the movement of a lever to allow visible inspection of the cornea and contact lenses. An interference ultraviolet filter in communication with a single light source permits the cornea to be viewed under ultraviolet light as well as ordinary visible light.

12 Claims, 9 Drawing Figures

PATENTED DEC 11 1973

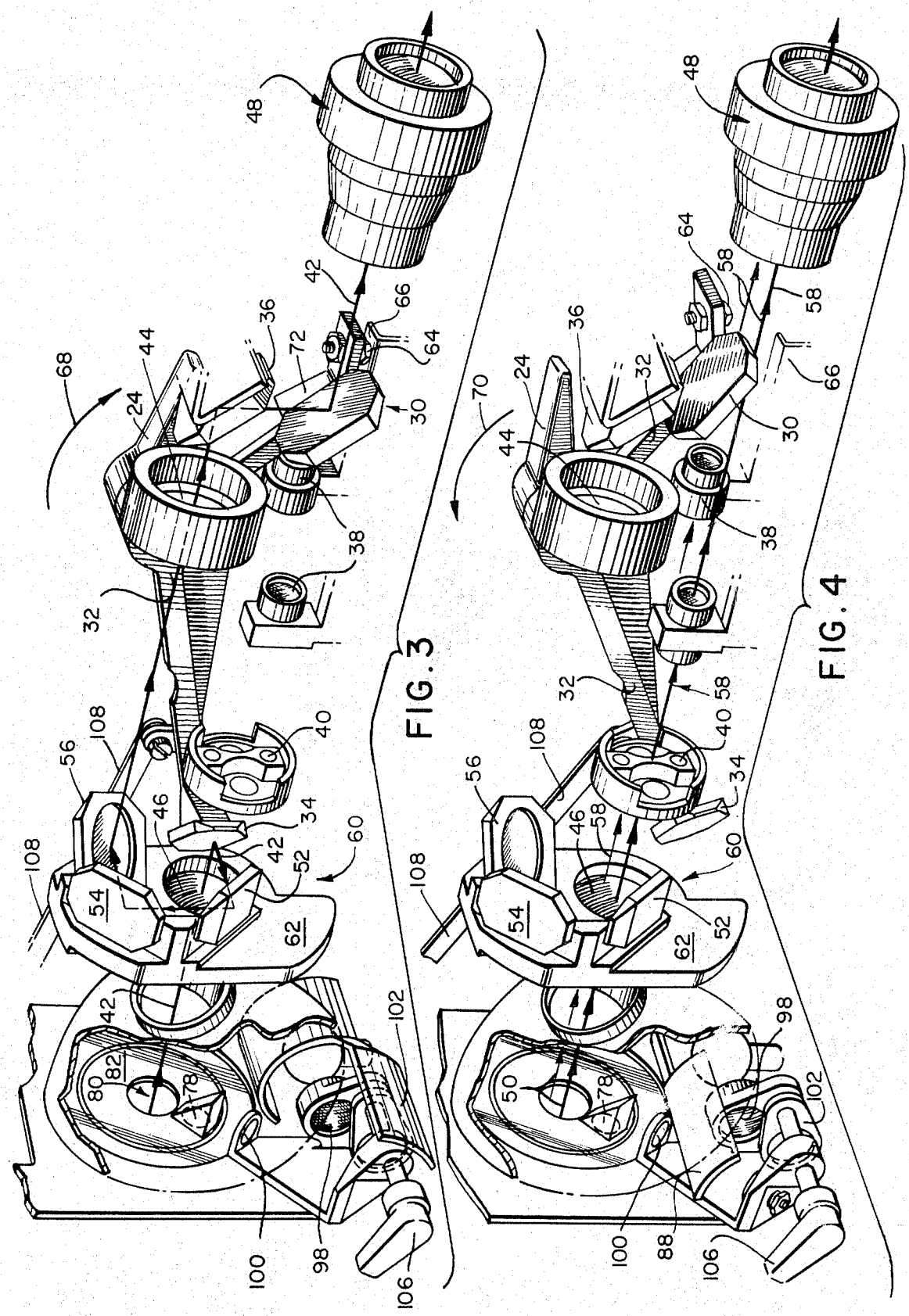

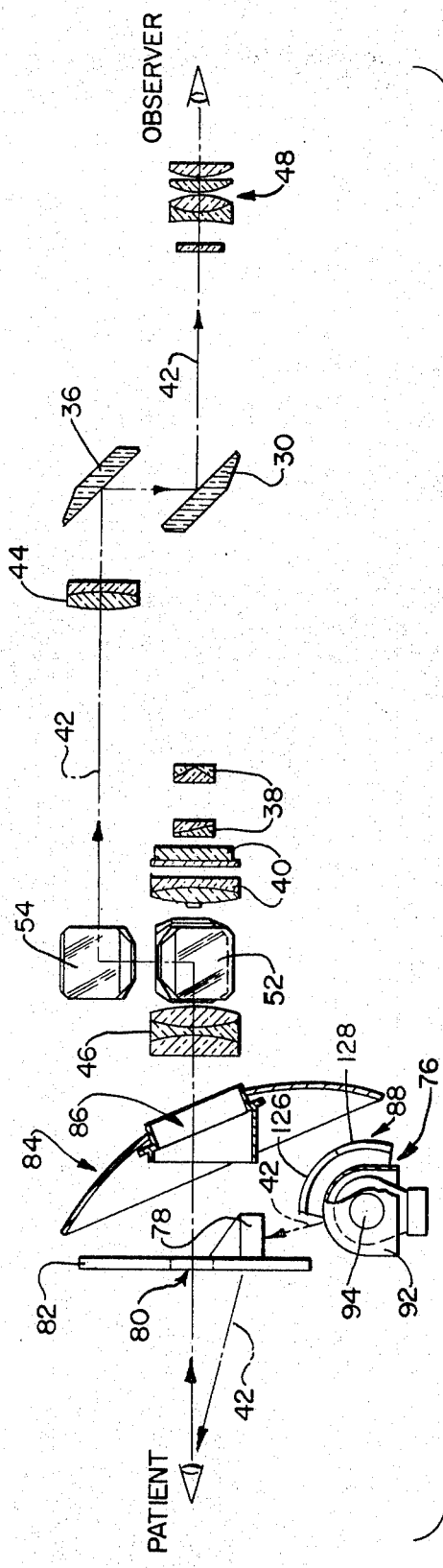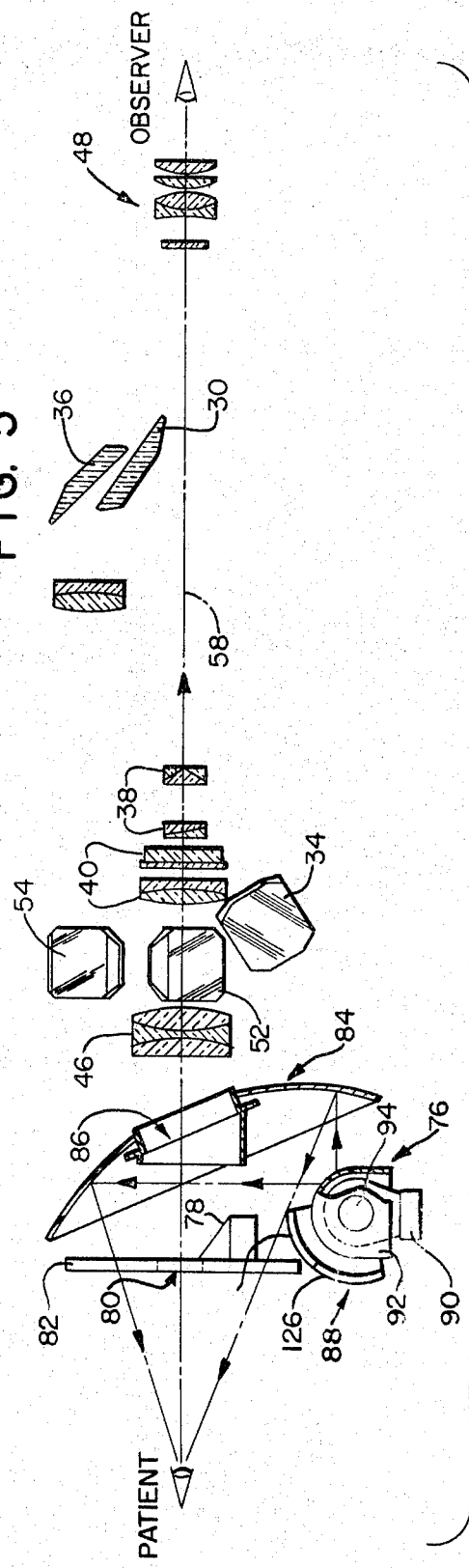
FIG. 5
FIG. 6

3,778,164

OPHTHALMOMETER HAVING ALTERNATIVE VIEWING MEASURING SYSTEMS AND INCLUDING IMPROVED CONTACT LENS HOLDING MEANS

BACKGROUND OF THE INVENTION

The field of the present invention is optics in general and ophthalmometers or keratometers as they are sometimes called, in particular.

Because it is unrivaled for swift and accurate measurements of the curvature of the anterior surface of the cornea, the chief refracting surface of the human eye, ophthalmometers are widely used for designing and fitting corneal contact lenses. However, for a proper fit of a contact lens, more than a measurement of the curvature of the anterior surface of the cornea is necessary. To properly fit a contact lens, it is also necessary to view the cornea under both white and ultraviolet light illumination. Furthermore, it is desirable to view the cornea before, during and after the fitting of a contact lens. For example, it is valuable before fitting contact lenses to locate any scars that might be present on the cornea. It is also desirable to view the cornea during fitting to ascertain whether or not the contact lens is scratching the cornea. In addition to the foregoing reasons for viewing the cornea, after contact lenses have been fitted and worn for an appreciable period of time, it is desirable to view the cornea again in order to ascertain whether or not the contact lens is causing scars to form on the cornea and to ascertain whether or not the shape of the cornea has changed as a result of wearing contact lenses.

The proper fitting of contact lenses also involves the well known fluorescein staining technique. This technique includes a visual examination of the cornea while under ultraviolet illumination.

Prior art ophthalmometers only measure curvatures and cannot aid a physician in the visual examination of the cornea. Thus, although a patient's cornea is optically aligned with the measuring circuit of the ophthalmometer when this instrument is used to measure cornea curvature, often that alignment is disturbed in order to perform necessary visual examinations of the cornea. As will become apparent to those skilled in the art, an ophthalmometer which enables the operator to view the cornea, without disturbing the position in which the patient has been placed for measurement, is an extremely valuable examining instrument.

It will be noted that the ophthalmometer of the present invention allows the operator to view the cornea after being measured by moving a lever on the instrument. Thus, simple movement of a lever switches the instrument from a measuring mode to a viewing mode and vice versa.

Prior to the present invention, an observer fitting contact lenses either performed the viewing procedure with his naked eye or with the aid of a hand-held magnifier. This technique, of course, has significant limitations, not to mention the fact that the positioned patient, who is properly aligned for cornea measurements, is disturbed.

SUMMARY OF THE INVENTION

The foregoing disadvantages of prior art ophthalmometers are significantly overcome by the ophthalmometer of the present invention which is a single instrument which can measure the curvature of the cornea or a contact lens and enable the cornea or contact lens to be viewed under magnification. The ophthalmometer also contains a means for illuminating the cornea with ultraviolet light to facilitate the fluorescein staining procedure.

Accordingly, it is an object of the present invention to provide an ophthalmometer which includes both a viewing circuit and a measuring circuit.

A further object of the invention is to provide an ophthalmometer which enables the operator to view the cornea under magnification as well as measure the curvature of the cornea.

Yet another object of the present invention is to provide an ophthalmometer which is switchable from a measuring mode to a viewing mode by the action of a lever.

Another object of the present invention is to provide an instrument which enables the operator to view a patient's cornea with the patient in the same position as the one from which cornea curvature measurements were taken.

Another object of the present invention is the provision of an ophthalmometer with a new and improved means for measuring and viewing a contact lens.

Still another object of the present inventionn is to provide an ophthalmometer which includes a source of ultraviolet light for illuminating a patient's cornea.

Another object of the present invention is to provide a new and improved device for designing and fitting contact lenses.

BRIEF DESCRIPTION OF THE DRAWING

FIG. 3 is a perspective view showing the orientation of the various optical components in the head of the ophthalmometer of the present invention when the components are in a viewing mode;

FIG. 4 is a view similar to FIG. 3 but showing the components as they would be positioned for a measuring mode;

FIG. 5 is the optical circuit for the ophthalmometer when in a viewing mode;

FIG. 6 is the optical circuit for the ophthalmometer when in a measuring mode;

DESCRIPTION OF THE PREFERRED EMBODIMENTS

Figure 1:
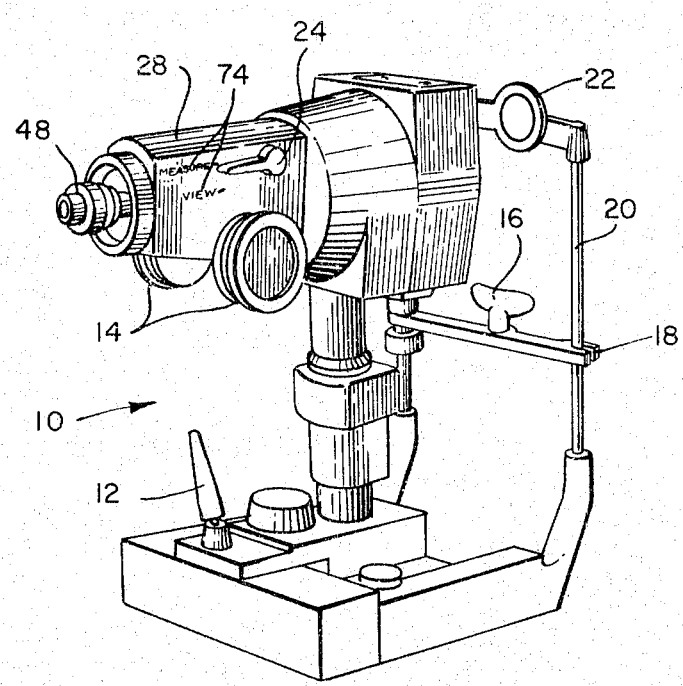
FIG. 1 is a perspective view of the ophthalmometer of the present invention.

At the outset, it should be noted that the measuring circuit of the ophthalmometer of the present invention employs optical components that have been used in prior art instruments. Briefly, these components include means for reflecting an image formed by the spherically reflecting cornea and doubling that image. The image itself is formed by illuminating "mires" on the cornea, and the doubling is accomplished by a double refracting prism. The "mires" are mounted on a rotatable circular arc so that the curvature of any diameter of the cornea can be measured by observation through a microscope.

The principle of ophthalmometry or keratometry, upon which these optical components are designed, involves utilizing the properties of the anterior surface of the cornea as a highly polished small convex spherical mirror. To measure the radius of curvature of the cornea as a spherical reflecting surface, a target or mire of known size, $o$, is placed at a known distance, $u$, from the corneal surface. The size of the virtual image, $i$, formed by reflected rays is measured using calibrated doubling devices in a microscope. If it is assumed that the object distance is sufficiently large for the relatively small curvature, then the image may be considered to be located in the focal plane of the cornea. Furthermore, if paraxial conditions are assumed, the focal length, $f$, may be considered equal to one half of the radius of curvature of the cornea. Thus, where $v$ is the image distance behind the anterior corneal surface, $r$ is the radius of the cornea and $f$ is the focal point, $$v = f$$

and $$f = r/2$$

$$i/o = f/u = r/2u$$

from which $$r = 2ui/o$$

This relationship is one of the fundamental questions of ophthalmometry and states that the finite virtual image formed is proportional to the radius of curvature of the cornea, the size of the object or mire, and the distance of the object from the cornea.

This virtual image becomes an object for the measuring portion of the ophthalmometer and a real inverted image of it is formed within the instrument. The size of this real image may be measured by one of several quantitative doubling techniques. These doubling techniques are necessary because the fine fixation tremor of the eye will not allow accurate measurement of the corneal image size by a linar scale in the plane of the reticle of the instrument. However, when a doubling method is used, both images are equally affected by these fine movements; therefore, they will not interfere with the measurement. The amount of doubling equals the size of the real image formed within the instrument. This may be done either by fixed doubling with varying object size or by constant object size with variable doubling. The amount of doubling may easily be calculated, and, therefore, the size of the real inverted image formed on the reticle of the instrument is known. Since the real image formed within the ophthalmometer is proportional to the size of the virtual corneal image through the dioptrics of the instrument, the radius of curvature of the cornea may be calculated from the relationship described above.

Ophthalmometer 10 of the present invention is shown in FIG. 1 to include various components for positioning the instrument and measuring the cornea of a patient such as positioning bar 12, measuring drums 14, rest 16, upon which the patient's chin is positioned, a cross support 18 for chin rest 16, cross support uprights 20 and an occluder 22 for occluding the eye not being tested. Since the foregoing components are standard and form no part of the present invention, they are not described further. Also shown in FIG. 1 is an optical circuit switch lever 24 which is described below in greater detail.

Figure 2:
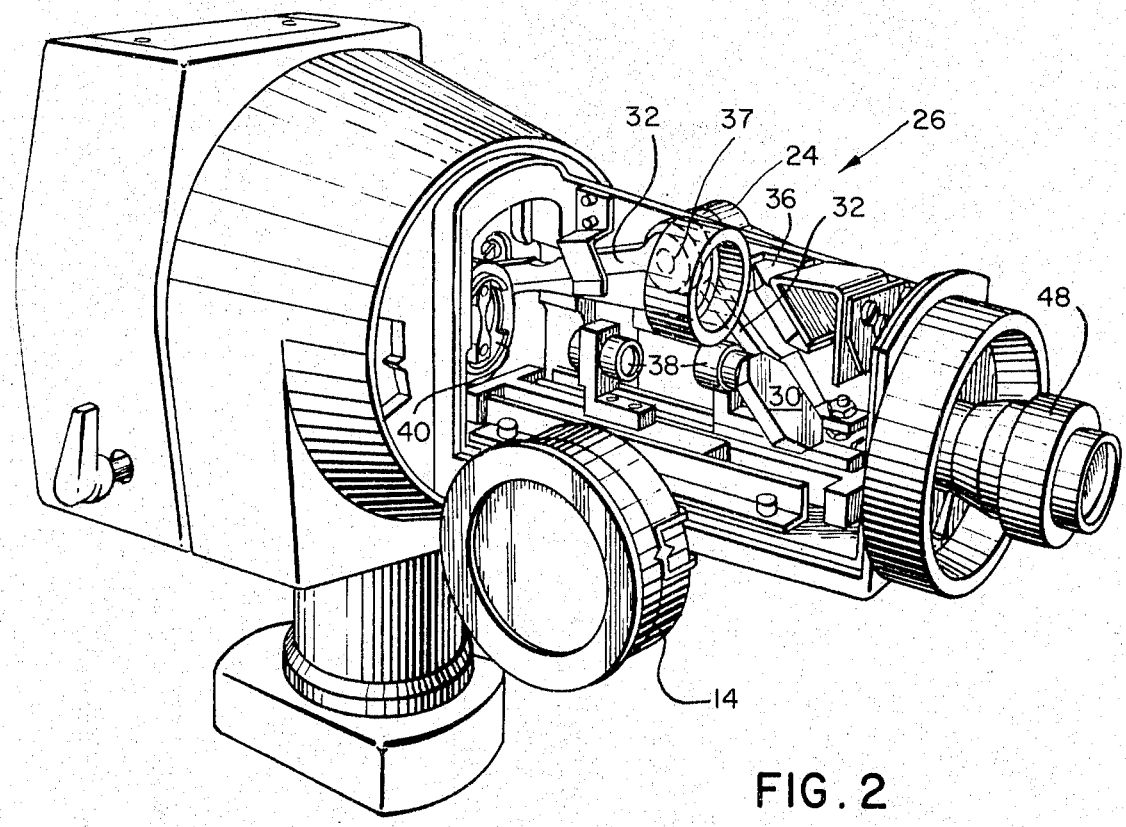
FIG. 2 is a perspective view of the head of the ophthalmometer of FIG. 1 with the canopy wall removed and taken from the opposite side of the instrument shown in FIG. 1.

In FIG. 2, the head 26 of ophthalmometer 10 which houses various optical components is shown with canopy wall 28 removed. As is shown in FIG. 2, the optical components include a first movable mirror 30 which is affixed to a movable support member 32. Firmly affixed to the opposite end of movable support member 32 is second movable mirror 34 (see FIGS. 3 and 4). Movable support member 32 has a yoke-like appearance which is pivotable about an axis. An aperture in support member 32 which is concentric with the axis about which support member 32 pivots, receives a pin 37. Pin 37 joins support member 32 with switch lever 24 so that clockwise movement of lever 24 causes clockwise movement of the arms on support member 32. Counterclockwise movement of lever 24 causes a similar counterclockwise movement of support member 32. A first fixed mirror 36 is attached to head 26 in the manner shown in FIG. 2. Also shown in FIG. 2 are achromatic wedges or deviation prisms 38 and lenses 40. Since prisms 38 and lenses 40 are standard components used in conventional ophthalmometers or kerotometers for measuring the curvature of the cornea, they are not described further.

The ability of the ophthalmometer of the present invention to both view with magnification and measure a cornea is best illustrated in FIGS. 3–6. As is shown in FIGS. 3 and 5, light represented by arrow 42 passes between the patient's eye and the observer's eye by being reflected by a number of mirrors or reflecting surfaces. As the light represented by arrow 42 travels through the instrument, it is magnified by lenses 46 and 48. The light, before reaching the observer, passes through a relay lens 44 and eye piece 48. As will be apparent, the microscope objectives for the viewing mode are the same lenses which are used to magnify the image of the mire during the measuring mode; that is, lenses 46 and 48.

As is best shown in FIG. 3, light 42 which is reflected by the patient's cornea strikes second movable mirror 34 whereupon it is reflected to mirror 52 and then is reflected upwardly to mirror 54 and on to mirror 56 before passing through relay lens 44. After passing through lens 44, light is then reflected by fixed mirror 36 whereupon it is directed to first movable mirror 30 and on through eye piece 48. With movable mirror 34 oriented in relationship to mirrors 52, 54 and 56, as is shown in FIG. 3, a Porro type mirror system results; that is, the arrangement of these mirrors is the equivalent of a Porro prism system which is a system which consists of two right angle prisms placed at right angles to each other which displace light by a pre-determined amount. In the Porro system shown in FIG. 3, light is displaced by an amount equal to the distance between the center of mirror 34 and the center of mirror 56.

The ability of an operator to convert a viewing mode of operation to a measuring mode of operation results from the fact that one of the mirrors (second movable mirror 34) in the Porro mirror system can be moved downward to the position shown in FIG. 4 enabling light, represented by arrows 58, to pass through the measuring components, such as wedges 38 and lens 40. Thus, as is shown in FIGS. 3 and 4, the Porro mirror system 60 includes three fixed mirrors 52, 54 and 56 affixed to a Porro frame 62. As is also shown in FIGS. 3 and 4, lens 46 is mounted within an aperture formed in Porro frame 62. The reflecting plane of mirrors 52, 54 and 56, which form three of the four surfaces for a Porro type mirror system 60, are maintained by securely positioning fixed mirrors 52, 54 and 56 so that the plane surface of fixed mirrors 52, 54 and 56 are at the correct angular relationship relative to each other. When second movable mirror 34 is in the position shown in FIG. 3, a fourth reflecting surface necessary for the Porro type mirror system results.

To adjust the position of mirror 34 and thus insure a proper orientation between second movable mirror 34 and the other three reflecting surfaces of the Porro system, support member 32 has an adjusting screw 64 at the end of member 32 opposite second movable mirror 34. Attached to head 26 is an adjusting platform 66.

When lever 24 is turned in a downward direction, as shown by arrow 68 of FIG. 3, adjusting screw 64 advances toward adjusting platform 66 until continued movement of lever 24 in the direction of arrow 68 causes adjusting screw 64 to make contact with adjusting platform 66.

By turning adjusting screw 64, the viewing mode rest position of second movable mirror 34 is adjusted. To switch the instrument from a viewing mode of operation to a measuring mode of operation, lever 24 is turned upward. By turning lever 24 upward in the direction shown by arrow 70 of FIG. 4, second movable mirror 34 is displaced downward and out of the path of travel of light passing through lens 46. Since light passing through lens 46 misses second movable mirror 34 when second movable mirror 34 is in the alternate rest position shown in FIG. 4, no light is reflected to the remainder of the Porro mirror system. Thus, as is shown in FIGS. 4 and 6, with second movable mirror displaced to the downward measuring mode rest position, light reflected from a patient's cornea passes through the measuring components which include lenses 40 and wedges 38 through lenses 48 whereat the operator is able to view the mires which are reflected from the patient's cornea. As is shown in FIGS. 4 and 6, first movable mirror 30 is out of the path of travel of light when the instrument is in a measuring mode. With movable mirror 30 attached to one end of support member 32 and with second movable mirror 34 attached to the other end, downward displacement of mirror 34 causes an upward displacement of mirror 30 and vice versa. The instrument is designed so that the upward displacement of mirror 30 which occurs when the instrument is switched to a measuring mode is sufficient to allow light to travel through the measuring components in the instrument and on through the lenses which form eye piece 48.

To prevent first movable mirror 30 from hitting first fixed mirror 36 when the lever 24 is switched to a measuring mode a stop 72 formed on support member 32 engages a corresponding stop (not shown) attached to head 26.

To view a patient's cornea, lever 24 is urged downward in a counterclockwise direction. To assist the operator, canopy 28 has a legend 74 (see FIG. 1) to indicate the proper position of lever 24 when in either the "measure" or "view" position. With lever 24 in a view position, second movable mirror 34 is aligned with mirrors 52, 54 and 56 to form a Porro type prism system. Thus, light from a source 76 is directed by a prism 78 to the patient's cornea (see FIG. 5). After striking the patient's cornea, the light travels through an aperture 80 formed in mire 82 and through a reflector 84. After passing through an aperture 86 in reflector 84, light rays 42 pass through lens 46. The light then travels through the rest of the optical components in the manner described above as is shown by arrow 42 of FIG. 5. With the lens configurations shown in FIG. 5, lenses 46 and 48 provide 15 power magnification.

To increase the efficiency of the instrument, the instrument is provided with a means for illuminating the cornea with light which is compatible with the measuring mode on the one hand and the viewing mode on the other hand. Thus, the instrument is provided with an optical arrangement which enables two different modes of illumination, each of which are synchronized with the two modes of operation of the instrument.

Light source 76 is inclusive of an incandescent bulb 90 To provide efficient illumination of the cornea when the instrument is in a viewing mode of operation, light source 76 includes an aperture 94 in diffuser 92. As is explained in more detail below, diffused light illumination is desirable when the instrument is in a measuring mode of operation; however, since diffused light is not desirable when the instrument is in a viewing mode of operation, the diffuser has an aperture 94 formed therein. Thus, light source 76 emits a significant amount of undiffused light through aperture 94. By a series of lenses, reflecting surfaces and a shutter, such undiffused light, represented by arrow 42 in FIG. 7, is flooded on to a patient's cornea only when the instrument is in a viewing mode of operation.

Figure 7:
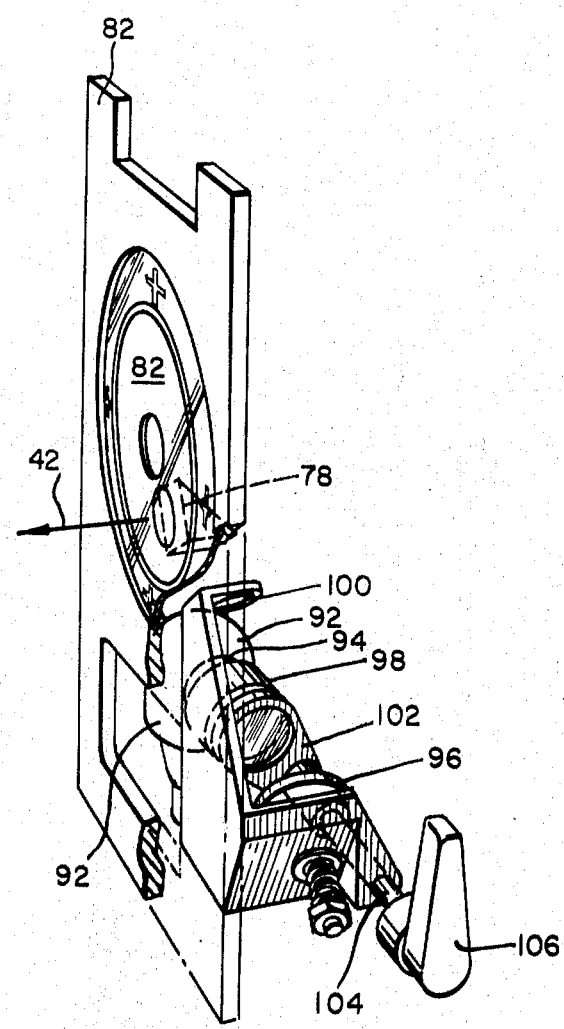
FIG. 7 is a perspective view of the mire of the ophthalmometer of the present invention showing various optical components secured thereto for flooding the cornea of a patient with undiffused light.

As is shown in FIG. 7, target or mire 82 has various optical components secured thereon. Such optical components include mirror 96, prism 78, and lenses 98 and 100. As is shown in FIG. 7, these components are secured to the frame which houses the target portion of mire 82. Light passing through aperture 94 in diffuser 92 travels through lens 98 and is then directed by mirror 96 through lens 100 to prism 78 and then on to the cornea.

As is shown in FIGS. 3, 4 and 7, the ophthalmometer of the present invention is also provided with an interference type ultraviolet filter 102. Ultraviolet filter 102 is a filter which allows ultraviolet light to pass through while blocking substantially all the non-ultraviolet light which is irradiated by bulb 90. It should be noted that incandescent bulbs produce a significant amount of ultraviolet light. Filter 102 is mounted on an axle 104 so that rotation of axle 104 causes rotation of filter 102. Filter 102 is provided with a pin (not shown) which serves as a stop to limit the amount of possible rotation for filter 102. The end of axle 104 opposite filter 102 protrudes through the housing of head 26, and a lever 106 is attached thereto. Lever 106 protrudes through head 26 on the opposite side of head 26 as is shown in FIG. 1. As is apparent, rotation of lever 106 causes rotation of ultraviolet filter 102.

The purpose of ultraviolet filter 102 is to enable the operator to flood a patient's cornea with ultraviolet light when desired, as is the case when performing fluorescein staining. Thus, when ultraviolet light is desired during the viewing mode of operation, the operator rotates lever 106 so that filter 102 is in the path of travel of light between lens 98 and mirror 96.

In addition to the foregoing optical scheme, the efficiency of the instrument of the present invention is further increased by the inclusion in the instrument of a shutter 88. Shutter 88 has two purposes, the first being to block light that would otherwise strike reflector 84 when the instrument is in a viewing mode of operation and secondly to cover aperture 94 when the instrument is in a measuring mode of operation. The foregoing is accomplished by a single shutter having the configuration shown in FIG. 8. Linkage between support member 32 and shutter 88 enables synchronization of shutter movement with mirror movement so that when mirror 34 is properly positioned for a viewing mode of operation, shutter 88 is properly positioned for viewing illumination.

Figure 8:
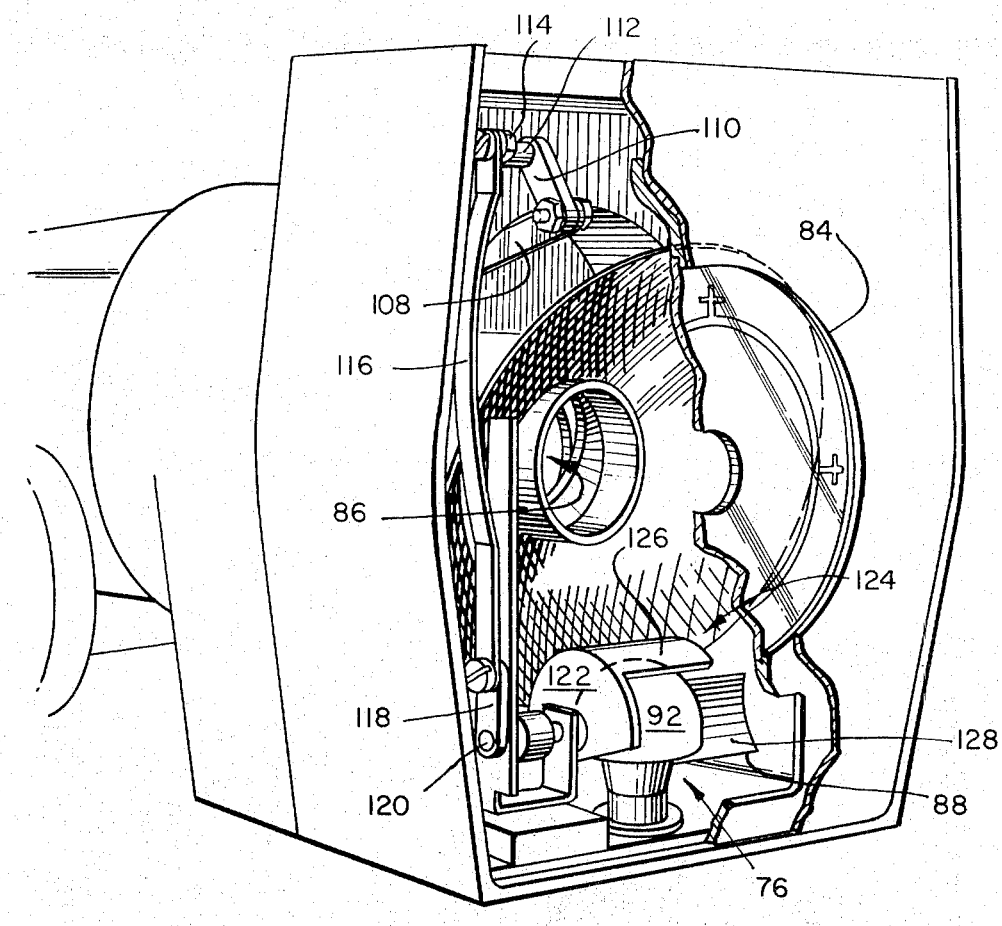
FIG. 8 is a perspective view of the patient's end of the ophthalmometer of the present invention with the outer wall portion removed and the mire partially in section.

The synchronization linkage is shown in FIGS. 3, 4 and 8. The synchronization linkage includes a first arm 108 which is pivotably secured to one end of support member 32, as is shown in FIGS. 3 and 4. The other end of first arm 108 is pivotably secured to a second arm 110. The opposite end of second arm 110 is rigidly secured to an axle 112. The other end of axle 112, in turn, has a third arm 114 rigidly secured thereto. The other end of third arm 114 is pivotably secured to a fourth arm 116 which, in turn, is pivotably secured to a cam 118 on an axle 120. Cam 118 translates the up and down movement of fourth arm 116 into rotary movement of axle 120. Shutter 88 in turn is rigidly secured to axle 120. As is apparent, movement of lever 24 causes movement of shutter 88. The linkage described above is designed so that when lever 24 is turned to the "view" position, shutter 88 will be in the position shown in FIGS. 5 and 3 at which position the path between light source 76 and reflector 84 is blocked.

As is shown in FIG. 8, shutter 88 has the configuration of a portion of a right circular cylinder and includes side wall 122 which is attached to arcuate wall 124. Arcuate wall 124 is formed with two portions or segments. First segment 126 blocks the light source 76 from reflector 84 when first segment is positioned therebetween as is shown in FIG. 5. With first segment 126 displaced to the position shown in FIG. 6, a second segment 128 blocks light emitting through aperture 94 by cutting off the optical path between mirror 96 and prism 78, thus, preventing undiffused light from reaching the patient's cornea.

When the instrument is in the measuring mode of operation, shutter 88 is in the position shown in FIG. 6.

With shutter 88 in this position, a substantial amount of the light from light source 76 will strike the reflector whereafter it is reflected by the patient's cornea and back through the instrument. As is stated above, the measuring circuit is dependent upon using the anterior surface of the cornea as a highly polished, small, convex, spherical mirror. An image is formed in the instrument by illuminating the target formed in mire 82 on the cornea. To form such an image, it is desirable to evenly illuminate the target. Thus, source 76 includes a diffuser 92 and an elliptical reflector 84. The elliptical reflector 84 is utilized as a means for uniformly illuminating the diffused light on the mire 82. To allow the image formed on the cornea to travel through the remainder of the instrument, mire 82 has an aperture 80 formed therein with elliptical reflector 84 having an aperture 86 formed therein.

After passing through aperture 86 in elliptical reflector 84, light represented by arrow 58 passes through the measuring components of the instrument. Since the measuring components are conventional, they are not described further.

Figure 9:
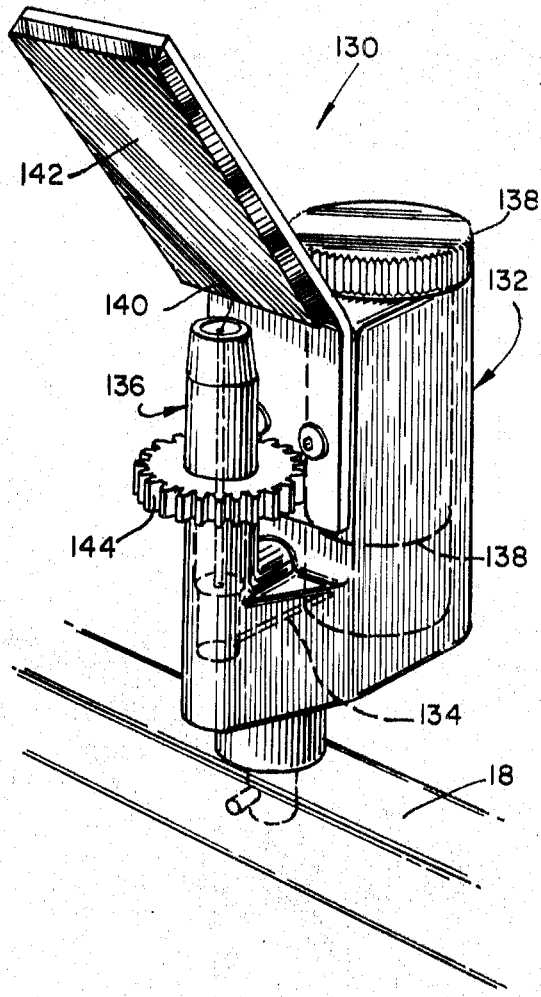
FIG. 9 is a perspective view of a contact lens holder which is utilized in combination with the ophthalmometer of the present invention.

In accordance with the present invention, not only is it possible to view the cornea itself, but the instrument can be utilized to view a contact lens. To enable the instrument to view a contact lens, the instrument is provided with a contact lens holder 130. As is shown in FIG. 9, contact lens holder 130 is adapted to be supported in chin rest support 18. Thus, to view a contact lens under magnification, chin rest 16 is removed from support 18 and contact lens holder 130 is mounted in place.

Contact lens holder 130 is inclusive of a central chamber 132 which holds a quantity of water. A fluid passageway 134 allows water to flow into lens support 136. A screw type piston 138 is capable of providing pressure on the upper surface of water within chamber 132 to cause water in chamber 132 to flow through lens support 136 and out of the top of lens support 136 through an opening 140 formed on the top thereof. As is apparent turning screw piston 138 in a direction to cause screw piston 138 to enter chamber 132 will force water in chamber 132 through passageway 134 and through opening 140. The water enables a contact lens to be secured on the top of lens holder 136 and also breaks down one reflecting surface of the contact lens, which is advantageous when viewing the lens through the ophthalmometer of the present invention. Contact lens holder 130 also includes a mirror 142. Mirror 142 is positioned to reflect an image of a surface of contact lens through the viewing optics of the ophthalmometer.

In accordance with the present invention, lens support 136 is rotatably mounted within a larger bore in holder 130 which is in communication with passageway 134. The bore receives the lens support, and the lens support 136 rests on a stop or shoulder at the bottom of the bore. Positioned concentrically about support 136 is a gnarled wheel or disk 144. As is apparent, rotation of disk 144 causes a rotation of a contact lens placed over opening 140. Thus, with a contact lens positioned on the contact lens holder, and with the contact lens holder positioned in place on the ophthalmometer, it is possible to view a contact lens under magnification and rotate the lens in a simple manner while it is being viewed. To view an edge of a contact lens, chin rest support 18 is moved up or down so that the edge of a contact lens to be viewed is in line with the optics of the instrument.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A device for measuring the curvature of a contact lens when the device is in a measuring mode of operation and viewing a contact lens with magnification when the device is in a viewing mode of operation comprising a target; means for reflecting an image of the target from a contact lens when the curvature of a contact lens is to be measured; a magnifying lens for magnifying the image of the target reflected from the contact lens to be measured; an eye piece for viewing the magnified image of the target reflected from the contact lens; an achromatic wedge for use when the device is in a measuring mode of operation, said wedge being positioned in optical alignment between said magnifying lens and said eye piece; means for directing light traveling between said magnifying lens and said eye piece away from said wedge and thereby prevent light reflected from a contact lens from passing through said wedge, a lever mounted externally on said housing, said means for directing the path of light away from said wedge being switchable by the action of said lever to enable an operator to switch said device from a measuring mode of operation to a viewing mode of operation by controllably causing light to pass through said magnifying lens, wedge and eye piece when said lever switches the device to a measuring mode of operation and controllably causing light to pass through said magnifying lens and eye piece without passing through said wedge when said lever switches the device to a viewing mode of operation; and a contact lens holder comprising a central chamber for holding a quantity of water; a lens support having an aperture formed in its upper surface fitted within the holder, said lens support being fitted within the holder so as to permit the lens support to rotate; a fluid passageway connecting said central chamber with said aperture in said lens support; a screw-type piston which is screwable into said central chamber and which is capable of exerting pressure on water placed within said chamber to cause the water to flow through said fluid passageway and out of said contact lens holder through said aperture; and a wheel mounted about said lens support, said wheel when rotated causing said lens support to rotate, thus, enabling an observer to rotate a contact lens placed on said lens support.

2. The device as set forth in claim 1 including a mirror on said lens holder, said mirror being at an angle relative to the axis of said lens support so as to reflect an image of a contact lens to a viewer when a contact lens is on said lens support.

3. The device as set forth in claim 1 also including a support member for supporting said contact lens holder, said support member being movable so as to permit the edge of a contact lens placed on said contact lens support to be in line with the viewing optics of the device.

4. The device as set forth in claim 3 wherein said support member is inclusive of a pair of vertical support members and a horizontal support member upon which the contact lens holder is mounted, said horizontal support member being movable in a vertical direction along said vertical support members.

5. The device as set forth in claim 3 wherein said means for directing the path of light away from said wedge is a movable mirror.

6. The device as set forth in claim 5 wherein said movable mirror is mounted on a support member connected to said lever.

7. The device as set forth in claim 6 wherein said support member has a yoke-like configuration and is pivotable about an axis.

8. The device as set forth in claim 7 including the aperture in the support member which is concentric with the axis about which the support member pivots and a pin mounted in said axis, said pin joining said support member to said lever.

9. The device as set forth in claim 8 including two movable mirrors attached to the support member.

10. The device as set forth in claim 9 wherein said two movable mirrors are attached to opposite ends of said support members so that when one mirror is moved in an upward direction, the other mirror is moved in a downward direction.

11. The device as set forth in claim 10 wherein said movable mirrors are positionable in two alternate positions of rest, one position being the position in which the mirrors are positioned to enable the device to be in a measuring mode of operation with the other position being the position in which the mirrors are positioned to enable the device to be in a viewing mode of operation, said mirrors being oriented when in said viewing mode of operation so that light reflected from a contact lens to be viewed strikes one movable mirror which changes the direction of the path of travel of light away from said wedges, the other movable mirror reflecting light through said eye piece.

12. The device as set forth in claim 11 wherein said movable mirrors when positioned in the alternate position of rest to permit a measuring mode of operation are so positioned that light reflected from a contact lens passes through said wedges and said eye piece without striking either of said mirrors.

* * * * *